United States Patent [19]

Reinhardt et al.

[11] Patent Number: 4,885,014

[45] Date of Patent: Dec. 5, 1989

[54] APPARATUS FOR FILTERING GASES

[75] Inventors: Erich Reinhardt, Bietigheim-Bissingen; Rainer H. Schubert, Crailsheim, both of Fed. Rep. of Germany

[73] Assignee: Schumacher'sche Fabrik GmbH & Co. KG, Crailsheim, Fed. Rep. of Germany

[21] Appl. No.: 162,317

[22] PCT Filed: May 30, 1986

[86] PCT No.: PCT/DE86/00223

§ 371 Date: Mar. 15, 1988

§ 102(e) Date: Mar. 15, 1988

[87] PCT Pub. No.: WO87/07180

PCT Pub. Date: Dec. 3, 1987

[51] Int. Cl.$^4$ ............................................. B01D 46/24
[52] U.S. Cl. ........................................ 55/484; 55/507; 55/508; 55/523
[58] Field of Search ................. 55/378, 474, 484, 504, 55/507–509, 523

[56] References Cited

U.S. PATENT DOCUMENTS

| | | | |
|---|---|---|---|
| 4,692,176 | 9/1987 | Israelson | 55/523 X |
| 4,725,356 | 2/1988 | Zievers et al. | 55/484 X |
| 4,735,635 | 4/1988 | Israelson et al. | 55/378 X |

FOREIGN PATENT DOCUMENTS

| | | |
|---|---|---|
| 2269177 | 4/1975 | France . |
| 2556608 | 12/1983 | France . |
| 627091 | 12/1981 | Switzerland . |

*Primary Examiner*—Charles Hart
*Attorney, Agent, or Firm*—Lorusso & Loud

[57] ABSTRACT

In an apparatus for filtering gases with a closed container which is divided by a horizontal perforated plate into a lower compartment provided with a gas inlet and an upper compartment provided with a gas outlet, and with tubular or candle-shaped filter elements which are sealingly suspended in holes of the perforated plate and are supported by a flange-type enlargement at their upper end on the perforated plate, in order to also ensure reliable sealing during swivel motion of the filter elements relative to the perforated plate, it is proposed that the flangetype enlargement form a bearing surface which lies on the surface of a sphere with center point above the bearing surface and on the vertical center axis of the filter element, and that the hole in the perforated plate so surround at a distance the filter shell of the filter element downwardly adjoining the enlargement that the filter element can swivel over a certain angular range about the center point of the sphere.

3 Claims, 1 Drawing Sheet

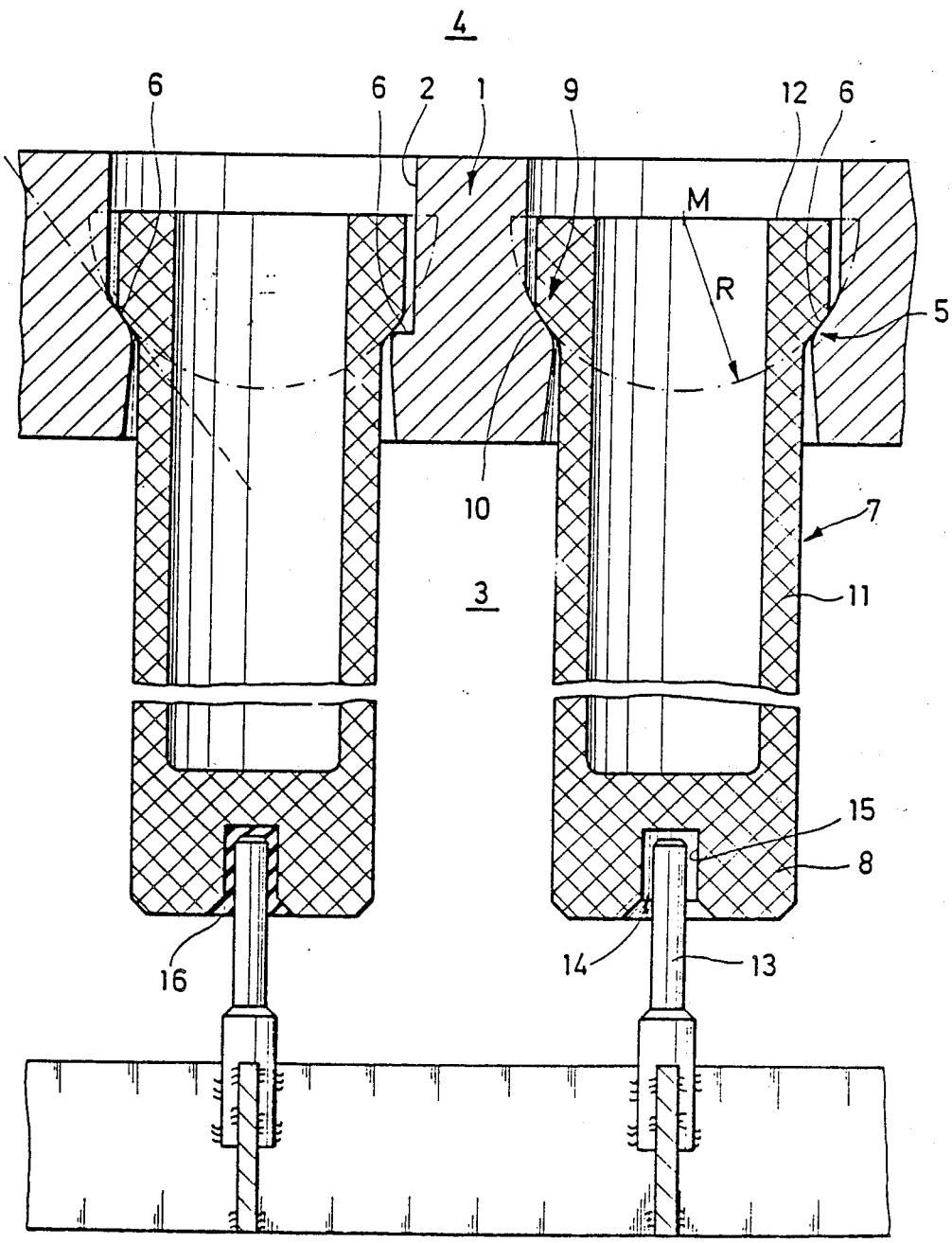

APPARATUS FOR FILTERING GASES

The invention relates to an apparatus for filtering gases with a closed container which is divided by a horizontal perforated plate into a lower compartment provided with a gas inlet and an upper compartment provided with a gas outlet, and with tubular or candle-shaped filter elements which are sealingly suspended in holes of the perforated plate and are supported by a flange-type enlargement at their upper end on the perforated plate.

Apparatus of this kind are used, for example, to filter hot gases which result from coal gasification. The gas to be filtered flows under positive pressure from the outside to the inside through the filter elements, and in known apparatus a very large number of such filter elements are suspended parallel to one another in the perforated plate. On account of local pressure fluctuations, lateral forces may act on the filter elements and cause the filter elements to be swivelled in their supporting seat. In this case, the filter elements are automatically partly lifted off their supporting surface, which eliminates the seal between filter elements and perforated plate.

Sealing could only be ensured by the filter elements in known perforated plates being clamped against the perforated plate by additional devices. In practice, however, this is difficult to realize as gases flow through the region of the filters at a very high temperature (e.g. 1000 degrees C.). Also, the arrangement of additional clamping elements would render the apparatus very complicated, and, in particular, it must be taken into account that the holes in the perforated plate are normally arranged very close together, which leaves little space for the arrangement of separate clamping elements.

Finally, in the event of an undesired high rise in pressure, such clamping elements would prevent the filter elements from being raisable for a short time from their sealing seat, thereby enabling them to assume the function of a safety valve.

The object of the invention is to so develop an apparatus of the generic kind that perfect sealing of the filter elements relative to the perforated plate is also ensured during swivel motion of the filter elements relative to the vertical center axis of the holes in the perforated plate without additional structural measures.

This object is achieved, in accordance with the invention, in an apparatus of the kind described at the beginning, by the flange-type enlargement forming a bearing surface which lies on the surface of a sphere with center point above the bearing surface and on the vertical center axis of the filter element, and by the hole in the perforated plate so surrounding at a distance the filter shell of the filter element downwardly adjoining the enlargement that the filter element can swivel over a certain angular range about the center point of the sphere.

This spherical-cap-type design of the bearing surface enables swivel motion of the filter element about the center point of the sphere surface without breaking the sealing contact with the surrounding supporting surface of the hole. Therefore, even in the case of slight swivel motion of the filter element, effective sealing between filter element and perforated plate is at any rate guaranteed.

Provision may be made for an inwardly protruding annular shoulder on which the bearing surface of the enlargement is supported to be arranged in the hole of the perforated plate.

It is expedient for the center point of the sphere surface to lie in the plane of the upper edge of the filter element as, in this way, the center point of the upper edge does not change its position relative to the perforated plate upon swivel motion of the filter element.

Provision may be made for the supporting surface of the perforated plate on which the bearing surface of the filter element rests to likewise lie on the sphere surface. A surface-to-surface contact between bearing surface and supporting surface which may result in a particularly effective sealing is then obtained.

In a modified embodiment, provision is made for the bearing surface to linearly abut a supporting surface. To this end, the supporting surface may, for example, be of conical construction, but it is also possible for the supporting surface to be in the form of a ring-shaped knife edge against which the bearing surface comes to rest.

In a preferred embodiment, stops which are preferably arranged on the bottom of the filter element are provided to delimit the swivel motion of the filter element.

For example, the stops may be formed by a vertical limiting element which is stationarily arranged in the lower compartment and dips upwardly with a play into a downwardly open cavity on a filter element suspended above it. Depending on the size of this play, larger or smaller swivel motions of the filter element are possible.

It is expedient for the cavity to be formed by a blind hole in the enlarged bottom of the filter element. In this case, an elastic plug which surrounds the limiting element is advantageously inserted in the blind hole.

The following description of a preferred embodiment serves in conjunction with the drawing to explain the invention in greater detail. The drawing shows a partial sectional view of a perforated plate with filter elements suspended therein.

A filter apparatus for gases comprises a closed container which is divided by a horizontal perforated plate into a lower compartment provided with a gas inlet and an upper compartment provided with a gas outlet. This container is not illustrated in the drawing; only a section of a horizontal perforated plate 1 is shown in which there are arranged alongside one another several continuous holes 2 which connect the lower compartment 3 located below the perforated plate 1 with the upper compartment 4 located above the perforated plate. The perforated plate 1 can be made, for example, of high-grade steel and extends over the entire cross-sectional area of the container which is not illustrated in the drawing.

In the illustrated embodiment, the holes 2 comprise an inwardly protruding annular shoulder 5 which forms at its upper side a supporting surface 6 for a filter element 7 suspended in each hole.

The filter elements are of cylindrical or candle-shaped design and comprise at their lower end a closed bottom 8 and at their upper open end a radially protruding enlargement 9 whose underside forms a bearing surface 10 supported on the supporting surface 6. This bearing surface 10 lies on the surface of a sphere whose center point M lies above the bearing surface on the vertical center axis of the filter element, in the illustrated embodiment in the plane of the upper edge 12 of the filter element. Hence bearing surface 10 has the shape of a spherical cap.

In the embodiment illustrated on the right in the drawing, the supporting surface 6 of the annular shoulder 5 also has the shape of a spherical cap, and the latter also lies on the same spherical surface, i.e., the bearing surface 10 abuts the supporting surface 6 of complementary configuration in a surface-to-surface manner. The hole 2 and the annular shoulder 5 surround at a slight distance the filter shell 11 downwardly adjoining the enlargement, which enables swivel motion of the filter element relative to the vertical center axis of the hole 2. During such swivel motion, the spherical-cap-shaped bearing surface 10 slides along the supporting surface 6 of complementary configuration, with surface-to-surface contact being maintained between the bearing surface and the supporting surface during each possible swivel motion.

In the illustrated embodiment, the filter element is directly supported with its bearing surface on the supporting surface of the annular shoulder; an annular seal which is preferably likewise of spherical-cap-shaped configuration could also be placed between these.

In the filter element on the left in the drawing, further possibilities for supporting the spherical-cap-shaped bearing surface on a modified supporting surface are indicated, for example, the supporting surface can be of conical shape (left side of the left filter element) or the supporting surface can be knife-edge-shaped (right side of the left filter element). In both cases, the spherical cap configuration of the bearing surface ensures that reliable and sealing contact is maintained on all sides during swivel motion of the filter element.

Within the scope of the invention, a reversal is also possible, i.e., a knife-edge-shaped bearing surface on the filter element could also cooperate in the same manner with a spherical-cap-shaped supporting surface.

Arranged in the lower compartment 3, under each filter element on the longitudinal center axis of the corresponding hole 2 in the perforated plate 1 is a stationary, vertically upwardly oriented, pin-shaped limiting element 13 which dips into a blind hole 14 in the enlarged bottom 8 of the corresponding filter element. The side walls 15 of the blind hole 14 surround the limiting element 13 at a distance from it. The limiting element 13 strikes the side wall 15 of the blind hole 14 when the corresponding filter element is swivelled beyond a predetermined angular amount relative to the longitudinal axis of the corresponding hole 2, i.e., the swivel motion of each filter element is limited by this limiting element 13. This is necessary in order to avoid mutual damaging of neighboring filter elements.

To prevent hard striking of the limiting element 13 against the side walls 15 of the blind hole 14, an elastic plug 16 which surrounds the limiting element 13, as illustrated in the left filter element of the drawing, can be inserted into the blind hole 14. In this way, an additional restoring torque is also generated for the filter element.

The described structural measures also enable reliable sealing of the filter elements relative to the perforated plate when the filter elements are swivelled to a slight extent relative to the vertical. In this case, it is not necessary to provide additional devices; in particular, the filter elements are readily replaceable, also in the described structural design, without clamping elements having to be released, etc.

We claim:

1. Apparatus for filtering gases comprising a closed container which is divided by a horizontal perforated plate into a lower compartment provided with a gas inlet and an upper compartment provided with a gas outlet, tubular or candle-shaped filter elements which are sealingly suspended in holes of the perforated plate and are supported by a flange-type enlargement at their upper end on the perforated plate, wherein the flange-type enlargement forms a bearing surface which lies on the surface of a sphere with center point above the bearing surface and on the vertical center axis of the filter element, and wherein the hole in the perforated plate so surrounds at a distance the filter shell of the filter element downwardly adjoining the enlargement that the filter element can swivel over a certain angular range about the center point of the sphere, and stops provided at the bottom of the filter element for limitation of the swivel motion of the filter element, said stops formed by a vertical limiting element which is stationarily arranged in the lower compartment and dips upwardly with play into a downwardly open cavity in a filter element suspended above the vertical limiting element.

2. Apparatus according to claim 1, wherein the cavity is formed by a blind hole in the enlarged bottom of the filter element.

3. Apparatus according to claim 2, wherein an elastic plug which surrounds the limiting element is inserted into the blind hole.

* * * * *